United States Patent [19]

Gendreu

[11] 3,775,599

[45] Nov. 27, 1973

[54] LANDING AID SYSTEM
[75] Inventor: Robert Gendreu, Paris, France
[73] Assignee: Thomson-CSF, Paris, France
[22] Filed: Feb. 2, 1972
[21] Appl. No.: 222,763

[30] Foreign Application Priority Data
Feb. 12, 1971 France .............................. 7104821

[52] U.S. Cl...... 235/150.22, 235/150.26, 244/77 B, 343/5 LS
[51] Int. Cl............................................. G06g 7/78
[58] Field of Search................. 235/150.22, 150.23, 235/150.26, 150.27, 186, 189; 244/77; 343/5 LS, 5 GC, 107, 108

[56] References Cited
UNITED STATES PATENTS
3,330,944 7/1967 Inderhees................... 235/150.22 X
3,469,079 9/1969 Stansbury..................... 235/150.23
3,504,335 3/1970 Hall et al. .................. 235/150.22 X
3,604,908 9/1971 Loome........................... 235/150.22
3,681,580 8/1972 Gwathmey..................... 235/150.22

Primary Examiner—Joseph F. Ruggiero
Attorney—John W. Malley et al.

[57] ABSTRACT

A landing aid system supplying accurate linear position information through comparison of rough information supplied by a conventional navigation system with information of similar nature obtained through integration of velocity or acceleration data supplied by a conventional on board data generator. Coordinate transformer, integrators and comparison loop are utilized for achieving said comparison and supplying said accurate information.

16 Claims, 5 Drawing Figures

LANDING AID SYSTEM

The invention relates to an assembly of electronic circuits which employ more or less precise data furnished by two independent navigation systems, at least one of which furnishes position data and the other furnishes speed or acceleration data, for example by a radio navigation system and the inertia unit of an aircraft, so as to determine more precise position and speed data in the vicinity of the landing runway. The principle of the operation of the device according to the invention consists in reconstituting the coordinates of the aircraft and of its velocity vector by integration of the data furnished by the inertia unit for example, and by comparison with these co-ordinate furnished by the radio navigation system.

According to the invention, there is provided a landing aid system comprising at least one first navigation device having a first output, furnishing the three coordinates, in a first system of given rectangular axes, of one of the velocity and acceleration vectors of the aircraft, at least one second navigation device, having a second output, independent of the first navigation device, furnishing the three co-ordinates of the position of the aircraft in a second system of given rectangular axes, said landing aid system further comprising:

a co-ordinate transformer, having a third output, for changing axes, furnishing the three co-ordinates of the considered vector in the second system of axes; and three identical integrating loops respectively associated with each of the axes, each loop comprising an input connected to said third output, a further input connected to said second output, at least one adding and integrating circuit having an output and a subtractor, connected between said output of the integrating and adding circuit and said further input, and having an output connected to the adding and integrating circuit, the latter supplying the co-ordinates, parallel to the considered axis, of the velocity and position of the aircraft, each loop having at least one output.

For a better understanding of the invention and to show how the same may be carried into effect, reference will be made to the ensuring description and the drawings which accompany it, in which.

Figure 1:
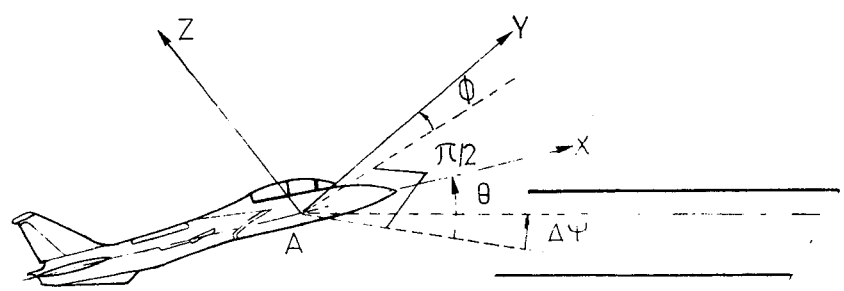
FIG. 1 is a diagram showing the parameters defining the position of the aircraft with respect to the runway.
Figure 1:
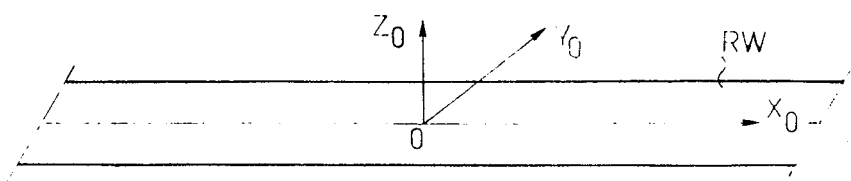

In FIG. 1 there is shown an aircraft assumed to be reduced to a point A, which is the phase centre of the antenna for example, approaching the runway RW having a longitudinal axis $OX_o$. The co-ordinates $X_o Y_o Z_o$ of the aircraft with respect to the right angled trihedral defined by the axes $OX_o Y_o Z_o$ in which $OZ_o$ extends in the same direction as the ascending vertical, define its position with respect to the runway; its orientation is defined by the trihedral ZXYZ fixed in the aircraft, which is obtained from the trihedral $OX_o Y_o Z_o$ by the translation $\overrightarrow{OA}$ and the rotation of $-\Delta\psi$ about $OZ_o$, then the rotation $\theta$ about a horizontal axis deduced from $OY_o$ by the rotation of $-\Delta\psi$, which brings the axis $OX_o$ to $OX$, then by the rotation of $-\Phi$ about $OX$, whence $\Delta\psi\theta$, and $\Phi$ are respectively the course of the aircraft with respect to the runway, its longitudinal attitude and its lateral attitude (or angles of pitch and respectively roll).

The inertia unit of the aircraft for example furnishes three parameters $l,m,t$ which are the first derivatives (co-ordinates of the velocity vector) or second derivatives (co-ordinates of the acceleration vector) of the co-ordinates of the aircraft: depending on the type of the unit, these co-ordinates are available with respect to the trihedral $OX_o Y_o Z_o$ or not.

Figure 2:
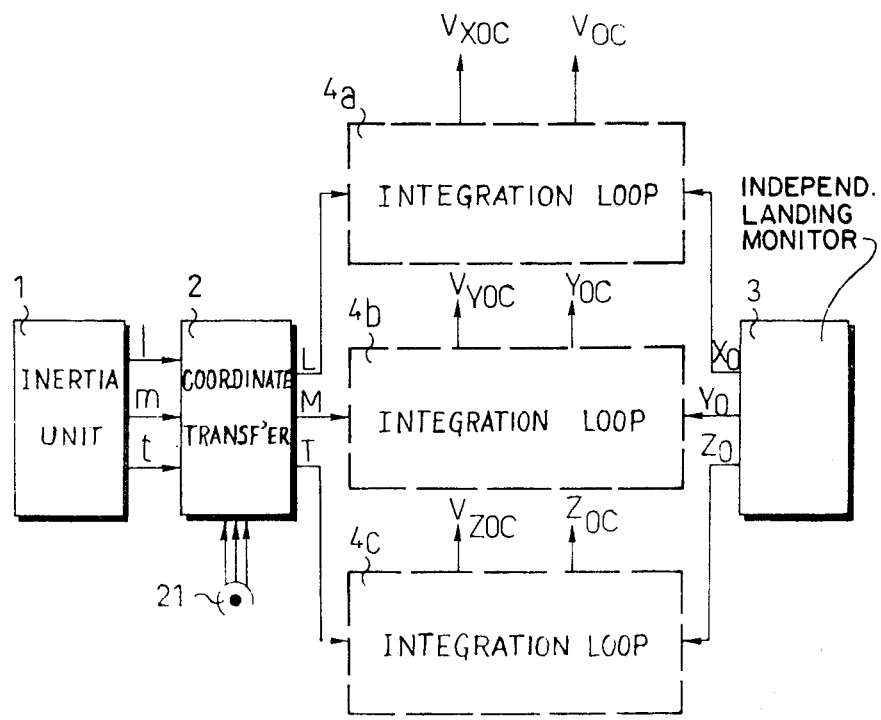
FIG. 2 is a synoptic diagram of the device according to the invention.

FIG. 2 shows the synoptic diagram of the device according to the invention nn the in general case where no particular hypothesis is made as to the nature of the signals $l,m,t$, available at the output of the inertia unit of the aircraft (1) except that they are the co-ordinates of a vector related to the displacement of the aircraft, velocity or acceleration vector, with respect to a tri-right angled trihedral.

The co-ordinates $L,M,T$ of this same vector with respect to the "runway" trihedral $OX_o Y_o Z_o$ are obtained at the output of the co-ordinates transformer 2; this device comprises in the known manner an assembly of algebraic adding and multiplying circuits, the co-ordinates $L,M,T$, being deduced from the co-ordinates $l,m,t$, by relations of the form:

$$L = a_1 l + a_2 m + a_3 t$$
$$M = b_1 l + b_2 m + d_3 t$$
$$T = c_1 l + c_2 m + c_3 t$$

where $a_1, a_2, a_3, b_1, b_2, b_3$, and $c_1, c_2, c_3$, are the linear functions of the sines and cosines of the angles $\lambda$, $\mu$, $\gamma$ defining the relative directions of the axes of the two tri-hedrals. If the coordinates $l,m,t$, are related to the trihedral AXYZ, the angles $\lambda$, $\mu$, $\gamma$ are the angles $\Phi$, $\theta$, and $\Delta\psi$.

The inputs $\lambda$, $\mu$, $\gamma$ of the device have been represented grouped together at 21 in order to avoid rendering the Figure too complicated.

The signals $L,M,T$ are respectively applied to the first inputs of the integration loops $4a$, $4b$, $4c$, which are identical, the second inputs of which receive respectively the signals $X_o Y_o Z_o$ furnished by an auxiliary navigation device 3, such as for example an Independent Landing Monitor (ILM) as described in the patent application of Gendreu et al. Ser. No. 217,071 filed Jan. 11, 1972 and entitled Independent Landing Monitor Pulse Radar System.

Each device $4_i$ ($i = a,b,c$) comprises two outputs at which are available respectively the corrected co-ordinates of the velocity $V_{Xoc}$, $V_{Yoc}$, $V_{Zoc}$ and the point A, namely $X_{oc}$, $Y_{oc}$ and $Z_{oc}$.

Figure 3:
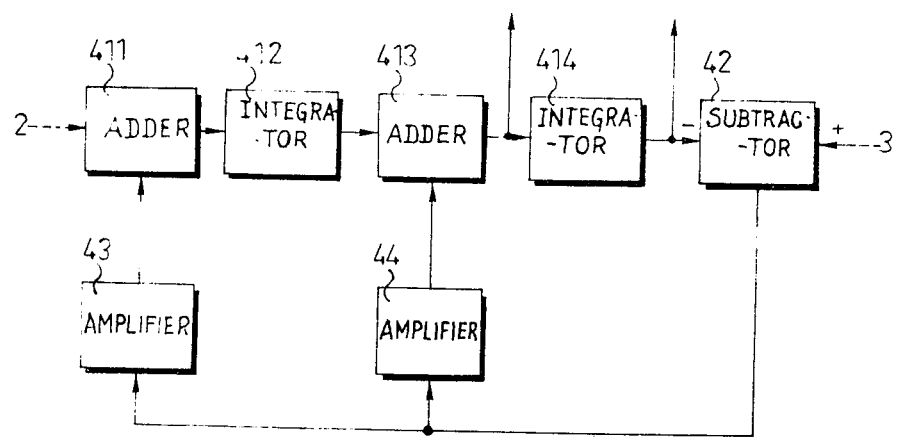
FIGS. 3 and 4 show embodiments of one of the elements $4a$, $4b$, $4c$ of the diagram shown in FIG. 2.
Figure 4:
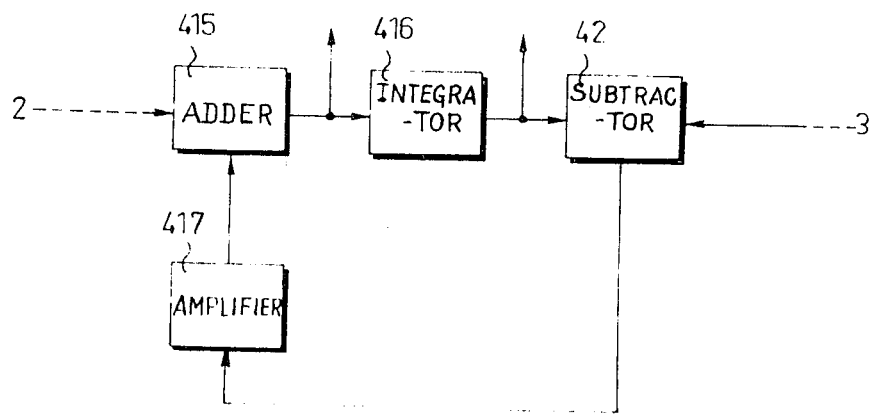

FIGS. 3 and 4 are embodiments of the devices $4a$, $4b$, $4c$ respectively in the case where the signals $L,M,T$ are the co-ordinates of the acceleration vector and in the case where they are the co-ordinates of the aircraft velocity vector.

In the first case, each device $4i$ comprises in series two identical units comprising each one an adder (411, 413) and an integrator (412, 414), and a subtractor 42.

The output signal of the integrator 414 and the position co-ordinates $X_o$, $Y_o$ or $Z_o$, as the case may be, furnished by the device 3, are compared in the subtractor 42. The output of the latter is connected in parallel to the amplifiers 43 and 44.

The input signal L,M or T, as the case may be, is applied to one of the inputs of the adder 411 whose second input is connected to the output of the amplifier 43. The output of the integrator 412 is connected to one of the inputs of the adder 413 whose other input is connected to the output of the amplifier 44. If the gains of the amplifiers 43 and 44 have been suitably chose, the output signal of the adder 413 is equal to the corrected component $V_{Xoc}$, $V_{Yoc}$, or $V_{Zoc}$ of the velocity of the aircraft. There is then obtained, at the output of the integrator 414, the corrected component $X_{oc}$, $Y_{oc}$, or $Z_{oc}$ of the aircraft.

The amplification coefficients $K_1$ and $K_2$ of the integrators must be so chosen that the system is well damped. It can be shown that the damping condition, corresponding for example to a double root of the differential equation of the loop, is $K_2 = K_1^2/4$, assuming that the two itegrators are identical.

The filtering of the noise on the input parameters of the system (L,M,T on one hand and $X_o$, $Y_o$, $Z_o$ on the other) is the better as $K_1, K_2$ are smaller. However, one is limited by the possible acceleration static error which produces a position error inversely proportional to $K_2$.

If the signals L,M,T represent the components of the velocity, the circuit, as shown in FIG. 4, is simpler since it has only an adder 415, an integrator 416 and an amplifier 417, the corrected component of the velocity being available at the output of the adder and that of the point A at the output of the integrator. This simpler solution on the other hand requires, in order to obtain the same precision as to the position of the aircraft, a static precision of the accelerometers which is much higher, for example $10^{-5}g$–$10^{-6}g$, whereas under the same conditions a precision of $10^{-3}g$ is sufficient with the circuit shown in FIG. 3.

In any case, the system according to the invention provides position and velocity data of good quality from radio data which are degraded by noise and insufficiency of the rate of repetition of the data, bearing in mind the speed of aircraft, and from data coming from an accelerometric unit of very ordinary precision; the instataneous position data thus obtained has only a constant or slowly varying error related essentially to the static precision of the devices 2 and 3 delivering the coarse data; the velocity thus determined is, then, practically exact.

Even if, for example, the ILM indicates to the pilot his position with a permanent constant error, he can land under excellent conditions, since he possesses, in addition to the position information, exact information concerning his instanteneous velocity.

When the unit 1 furnishes the co-ordinates l,m,t with respect to a trirectangled trihedral related to the ground, having axes $OX_N$, $OY_N$ $OZ_N$ in which OX is for example the north direction, the changing of co-ordinates at transformer 2 simply consists of a rotation with respect to the vertical, T being . . . identical to $t$ and L and M being related to $l$ and $m$ by the relation $$L = l \cos A_z - m \sin A_z$$
$$M = l \sin A_z = m \cos A_z$$

in which $A_z$ is the azimuth of the runway.

Figure 5:
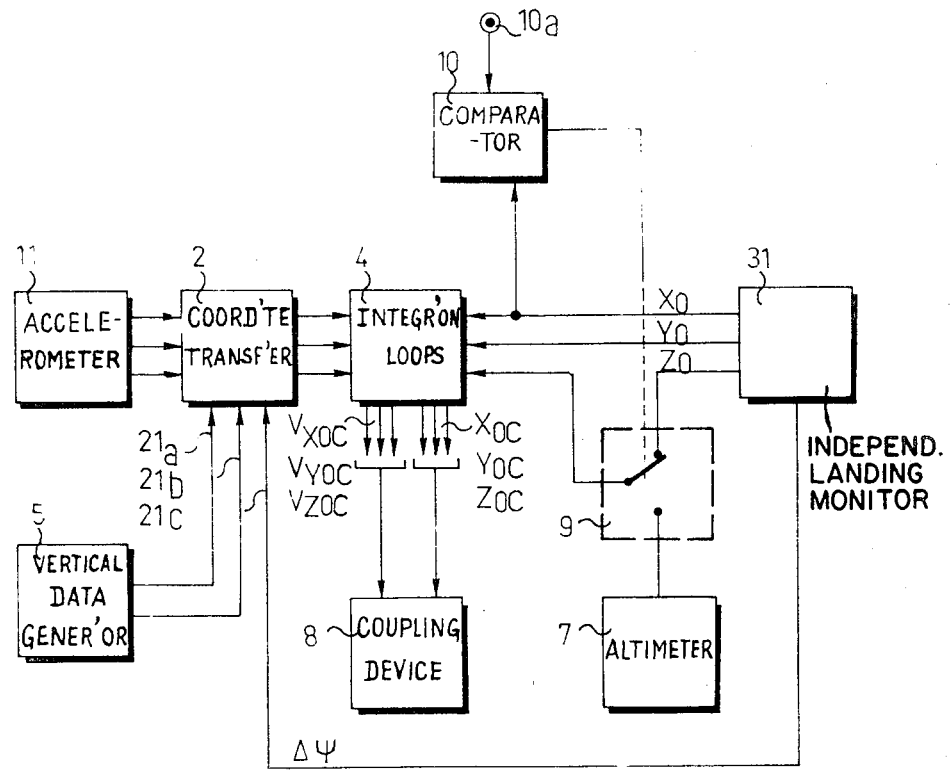
FIG. 5 is an example of the use of the device according to the invention.

FIG. 5 is a synoptic diagram showing an example of the utilization of the system according to the invention on an aircraft equipped with a device 11, for example an assembly of three accelerometers furnishing the co-ordinates of the acceleration vector with respect to the trihedral A X Y Z fixed in the aircraft (body axes), a vertical direction data generator 5 furnishing the lateral attitude angle $\Phi$, longitudinal attitude angle $\theta$, an improved ILM radar 31, such as that described in the aforementioned patent application furnishing the coarse values of coordinates $X_o$, $Y_o$ and $Z_o$ and the angle $\Delta \psi$ between the axis $O X_o$ and the axis A X or "course" with respect to the runway, an altimetric probe or altimeter 7, and an a coupling device 8 for coupling the output data (position and velocity) of loop 4 to the inputs of the automatic pilot or any piloting unit, device 8 fitting the output signals of loop 4 to the inputs of the piloting device.

In this Figure there are grouped at 4 the circuits 4a, 4b described in more detail with reference to FIG. 3.

The input 21 here comprises three terminals 21a, 21b and 21c, of which the first two are connected to the "roll" (angle $\Phi$ ) and pitch (angle $\theta$ ) outputs of the unit 5 and the third to the output $\Delta\psi$ of the radar ILM 31.

In the course of the landing, the attitude co-ordinate z at the input of the device 4 is taken from the output 20 of the ILM or from the altimetric probe 7. For this purpose, a switch 9 is placed between the device 4 and the probe. This switch can be controlled manually or automatically. In the latter case, a comparator 10 compares the crude distance $X_o$ or the crude altitude $Z_o$ with the predetermined values, which may be adjustable, $X_d$ or $Z_d$ applied to the reference input 10a (the distance has been chosen in the Figure), the output signal of the comparator controlling the switch 9.

The outputs $X_{oc}$, $Y_{oc}$, $Z_{oc}$, and $X_{oc}$ and $V_{zoc}$ may be advantageously connected to the addition inputs and to those of the stopping distance calculator, also described in said patent application.

Up till now no hypothesis has been made as to the nature of the various elements of the circuit, which elements are absolutely conventional and no hypothesis has been made as to the form of the input signals applied to the device 4, known adapting elements being inserted, if necessary, between successive elements such as rectifiers or, on the contrary, modulators, digital to analog converters or vice-versa .

The gyroscopic units and accelerometric units deliver, for example, carrier signals alternating at 400 c/s and the radar navigation device continuous carrier signals; in this case a rectifier may be placed between the devices 1 and 2 or 2 and 4, depending on the nature of the co-ordinates transformer.

The invention has been described for purpose of explanation in the assumption that the signals $l,m,t$, are furnished by an accelerometric unit and the signals $X_o$, $Y_o$, $Z_o$ by a radio device. It must be understood that these signals can be obtained in a different way; for example $l,m,t$, can be the co-ordinates of the velocity obtained from a Doppler radar, the essential being that the signals $l,m,t$, on one hand, and $X_o$, $Y_o$, $Z_o$, on the other, are furnished by devices independent of each other.

Of course, the invention is not limited to the embodiment described and shown which was given solely by way of example.

What is claimed is:

1. A landing aid system for an aircraft having associated velocity and acceleration vectors comprising at least one first navigation device having a first output, furnishing the three co-ordinates, in a first system of given rectangular axes, of one of said vectors of the aircraft, at least one second navigation device, having a second output, independent of the first navigation device, furnishing the three co-ordinates of the position of the aircraft in a second system of given rectangular axes, said landing aid system further comprising:

a coordinate transformer, having a third output, for changing axes furnishing the three co-ordinates of said one vector in the second system of axes; and three identical integrating loops respectively associated with each of the axes, each loop comprising two output terminals, an input connected to said third output, a further input connected to said second output, one adding and integrating circuit having a first input connected to said input of the loop, a second input and an output and a subtractor, connected between said output of the integrating and adding circuit and said further input of the loop, and having an output, connected to the second input of the adding and integrating circuit, the latter supplying the co-ordinates, parallel to the considered axis, of the velocity and position of the aircraft, to said output terminals.

2. A system as claimed in claim 1, wherein the first navigation device furnishes the coordinates of the velocity vector, each adding and integrating circuit comprising an adder having two inputs of which one is connected to the output of the first navigation device and the other to the output of the subtractor through an amplifier and an output, and an integrator connected in series between the output of the adder and the subtracter and having an output, each loop comprising two accessible output terminals, respectively the output of the adder furnishing the considered co-ordinate of the aircraft velocity and the output of the integrator furnishing the co-ordinate of the position of the aircraft.

3. A system as claimed in claim 1, wherein the first navigation device furnishes the coordinates of the acceleration vector, said adding and integrating circuit comprising :

two identical units in series, each of which comprise an adder having two inputs and an output, and an integrator having an input and an output, the adder of one of the units having two inputs coupled respectively to the first navigation device output and to the output of the subtractor, through a first amplifier and an output coupled to the input of the integrator of the same unit, the adder of the other unit, having inputs respectively coupled to the output of the integrator of the first unit and to the output of the subtractor, through a second amplifier, and an output coupled to the second integrator input, the output of said last mentioned integrator being coupled to the second input of the subtractor, and :

output terminals respectively connected to the input and to the output of the second integrator and furnishing respectively the considered co-ordinate of the velocity vector and that of the aircraft.

4. A system as claimed in claim 1, wherein the output terminals of said integrating loops are connected to the aircraft piloting devices.

5. A system as claimed in claim 1, comprising a device, having an output, for indicating the azimuth angle of the runway, wherein said second system of axes comprise a horizontal axis carried by the axis of the runway, a second horizontal axis and a vertical axis, and said first system of axes also comprises a vertical axis and an axis oriented in the north direction, said co-ordinate transformer comprising an input connected to the said azimuth angle indicating device output.

6. A system as claimed in claim 1, associated with a vertical axis data generator having longitudinal attitude and lateral attitude outputs, wherein said second system of axes comprises a horizontal axis carried by the axis of the runway, a second horizontal axis and a vertical axis, and said first system of axes is fixed in the aircraft and comprises the body axis, i.e., an axis carried by the longitudinal or roll axis of the aircraft , an axis perpendicular to the preceding and horizontal in stabilized flight as concerns roll, or lateral or pitch axis, and a yaw axis, wherein said second navigation device has a course output, said coordinate transformer comprising two inputs respectively connected to said longitudinal attitude and lateral attitude outputs, and a third input connected to said "course" output.

7. A system as claimed in claim 1, wherein said first and second devices are respectively constituted by a inertia unit and an Independent Landing Monitor.

8. A system as claimed in claim 1, comprising further means, having an output for determining the altitude and in which said second system of axes comprises a vertical axis, the coordinate of the aircraft, parallel to said axis, representing the altitude of the latter, said landing aid system comprising a switch for selectively connecting the second input of the integrating loop pertaining to the coordinate along the vertical axis to the output of the second navigation device when one of the altitude and distance parameters is greater than a given value and to the output of said further means when said parameter is smaller than said given value.

9. A system as claimed in claim 1, wherein the adding and integrating circuit of each loop comprises an adder having two inputs and an output, and an integrator connected in series between the output of the adder and the output of the adding and integrating circuit, the output of the adder furnishing the considered coordinate of the aircraft velocity and the output of the integrator furnishing the coordinate of the position of the aircraft, said outputs being connected respectively to the output terminals of the loop.

10. A landing aid system comprising at least one first navigation device having a first output, furnishing the three coordinates, in a first system of given rectangular axes, of the acceleration vector of the aircraft, at least one second navigation device, having a second output, independent of the first navigation device, furnishing the three coordinates of the position of the aircraft in a second system of given rectangular axes, said landing aid system further comprising:

a coordinate transformer, having a third output, for changing axes, furnishing the three coordinates of the acceleration vector in the second system of axes; and three identical integrating loops respectively associated with each of the axes, each loop comprising two output terminals, an input connected to said third output, a further input connected to said second output, a first adding and integrating circuit having a first input connected to said input of the loop, a second input and an output, a second adding and integrating circuit having a first input connected to the output of said first adding and integrating circuit, a second input and an output, and a subtractor connected between said output of the second adding and integrating circuit and said further input of the loop, and having an output, connected to the said second input of the two adding and integrating circuits, the second adding and integrating circuit supplying the coordinates, relative to the considered axis, of the velocity and position of the aircraft to said output terminals of the loop.

11. A system as claimed in claim 10, wherein each adding and integrating circuit of each loop comprises an adder having two inputs and an output, and an integrator connected in series between the output of the adder and the output of the adding and integrating circuit, and wherein the output of the adder and the output of the integrator of the second adding and integrating circuit, furnishing respectively the considered coordinates of the aircraft velocity and position, are connected respectively to the output terminals of said loop.

12. A system as claimed in claim 10, wherein the output terminals of said integrating loops are connected to the aircraft piloting devices.

13. A system as claimed in claim 10, comprising further means, having an output for determining the altitude and in which said second system of axes comprises a vertical axis, the coordinate of the aircraft, parallel to said axis, representing the altitude of the latter, said landing aid system comprising a switch for selectively connecting the second input of the integrating loop pertaining to the coordinate along the vertical axis to the output of the second navigation device when one of the altitude and distance parameters is greater than a given value and to the output of said further means when said parameter is smaller than said given value.

14. A system as claimed in claim 10, comprising a device, having an output, for indicating the azimuth angle of the runway, wherein said second system of axes comprise a horizontal axis carried by the axis of the runway, a second horizontal axis and a vertical axis, and said first system of axes also comprises a vertical axis and an axis oriented in the north direction, said co-ordinate transformer comprising an input connected to said azimuth angle indicating device output.

15. A system as claimed in claim 10, associated with a vertical axis data generator having longitudinal attitude and lateral attitude outputs, wherein said second system of axes comprises a horizontal axis carried by the axis of the runway, a second horizontal axis and a vertical axis, and said first system of axes is fixed in the aircraft and comprises the body axis, i.e. an axis carried by the longitudinal or roll axis of the aircraft, an axis perpendicular to the preceding and horizontal in stabilized flight as concerns roll, or lateral or pitch axis, and a yaw axis, wherein said second navigation device has a course output, said coordinate transformer comprising two inputs respectively connected to said longitudinal attitude and lateral attitude outputs, and a third input connected to said course output.

16. A system as claimed in claim 10, wherein said first and second devices are respectively constituted by an inertia unit and an Independent Landing Monitor.

* * * * *